May 2, 1939.  E. L. DURRELL  2,156,493

WATER-COOLED COUPLING

Filed April 20, 1936

INVENTOR
Ernest L. Durrell
BY
ATTORNEYS

Patented May 2, 1939

2,156,493

UNITED STATES PATENT OFFICE 2,156,493

WATER-COOLED COUPLING

Ernest L. Durrell, Detroit, Mich., assignor to American Blower Corporation, Detroit, Mich., a corporation of Delaware Application April 20, 1936, Serial No. 75,501

1 Claim. (Cl. 60—54)

My invention relates to hydraulic couplings, and in particular, to a method and means of controlling the temperature thereof and of the oil in the coupling.

It is the object of my invention to control the temperature of the coupling and its oil content, and of so regulating that temperature that the coupling will operate at such temperature as to provide its maximum efficiency for itself and the oil it contains.

It is an object to provide means of applying cold water or other cooling fluid on the surface of a rotating hydraulic coupling, and of throwing the heated water away from the coupling by reason of its rotation.

Referring to the drawing.

Figure 1:
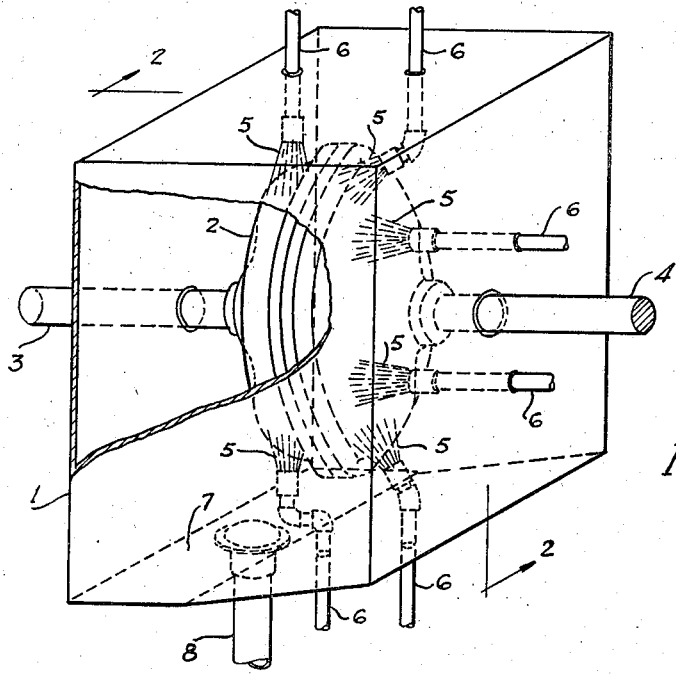
Figure 1 is a diagrammatic view showing the arrangement of the water sprays with respect to the surface of the coupling within the containing box.

Referring to the drawing in detail, the construction shown in the drawing is necessary when providing additional cooling facilities to hydraulic couplings, which, because of conditions of location or operation, generate such heat due to inadequate ventilation or long periods of stalling, that it is necessary to carry away the excess heat.

For this purpose the coupling is wholly or partially enclosed with a containing box 1. The coupling is designated 2. The shafts 3 and 4 are connected by the coupling. As this coupling rotates, the water sprays 5 are applied by the pipes 6 to the surface of the coupling. The centrifugal force acting upon the water, due to the rotation of the coupling, throws the water off against the side walls of the box 1, whence it runs down into the bottom of the box at 7, so that it can be carried to drain through the pipe 8, or may be utilized a second time.

Figure 2:
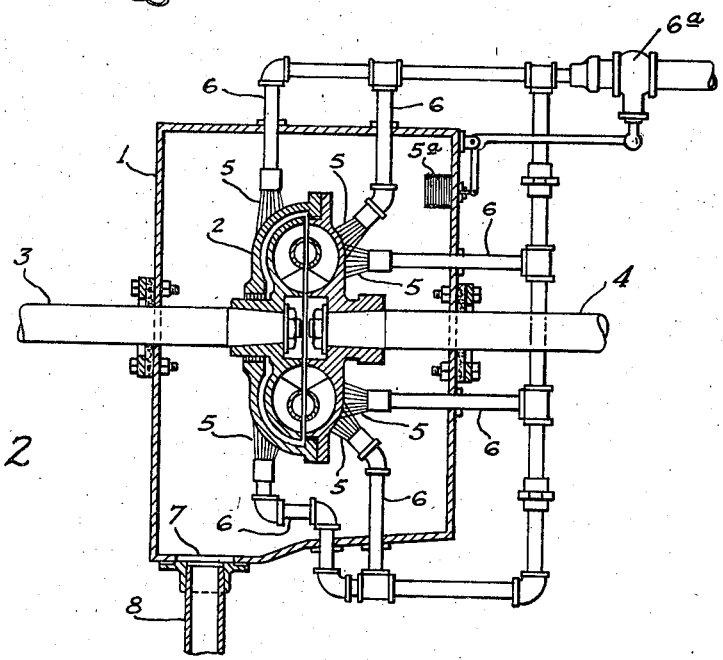
Figure 2 is a section on the line 2—2 of Figure 1.

If desired, a thermostatic control 5a responsive to the temperature at or adjacent the coupling can be arranged, as in Figure 2, so as to accurately control the temperature of the coupling by varying the quantity of water passing through the sprays or nozzles by adjusting the valve 6a. The pipes may be perforated or fitted with nozzles or sprays. They are placed in such a manner that a flow of water is directed from these outlets upon the exterior surface of the hydraulic couplings.

By this invention it is possible to hold the coupling in a stalled position for an indefinite length of time, when transmitting full engine torque, at a constant temperature of such a degree as not to be detrimental to the coupling's operation or the oil in the coupling.

It will be understood that I desire to comprehend within my invention such modifications as may be necessary to adapt it to varying conditions and uses.

Having thus fully described my invention, what I claim as new and desire to secure by Letters Patent is:

In a hydraulic transmission, a hydraulic coupling having a rotary casing and a plurality of rotors therein with vanes positioned for reaction with a working liquid therein, said working fluid transmitting to said casing the heat produced by said reaction; a housing enclosing said coupling, a fluid-withdrawing conduit connected to said housing, a plurality of spray nozzles in said housing directed at said casing, a cooling fluid discharge conduit connected to said nozzles, a valve in said discharge conduit arranged to control the distribution of cooling fluid to said nozzles, a valve actuator connected to said valve, a thermostat within said enclosure adjacent said coupling casing and operatively responsive to the heat given off by said coupling casing, and mechanism operatively connecting said thermostat to said valve actuator whereby to control the distribution of cooling fluid to said hydraulic coupling by the temperature in the vicinity of the casing of said hydraulic coupling.

ERNEST L. DURRELL.